United States Patent
Hildebrand

[11] 3,760,344
[45] Sept. 18, 1973

[54] SCANNED HOLOGRAPHY WITH A ROTATING EXTENDED SOURCE

[75] Inventor: Bernard P. Hildebrand, Vancouver, British Columbia, Canada

[73] Assignee: Batelle Development Corporation, Richland, Wash.

[22] Filed: July 28, 1971

[21] Appl. No.: 166,944

[52] U.S. Cl................ 340/5 H, 73/67.5 H, 343/17, 350/3.5
[51] Int. Cl.......................... G01s 9/66, G02b 27/00
[58] Field of Search....................... 340/5 H, 5 MP; 73/67.5 H; 343/17; 350/3.5

[56] References Cited
UNITED STATES PATENTS 3,640,598  2/1972  Neeley et al....................... 340/5 H
3,506,952  4/1970  Gabor et al........................ 340/5 H Primary Examiner—Richard A. Farley
Attorney—Woodcock, Washburn, Kurtz & Mackiewicz

[57] ABSTRACT

Either a planar or a spherical source of coherent radiation is rotated to scan its generated beam across an object scene. A substantially point radiation receiver is positioned to detect the object illuminating radiation after modification by the object. The receiver generates an electronic signal used in the construction of the hologram from which a three-dimensional image of the object scene may be reconstructed.

6 Claims, 2 Drawing Figures

PATENTED SEP 18 1973          3,760,344

SCANNED HOLOGRAPHY WITH A ROTATING EXTENDED SOURCE

BACKGROUND OF THE INVENTION

This invention relates to an improved technique in the art of holography and more particularly to that type of holography in which scanning techniques are employed.

The basic technique in off-axis holography will be briefly described. As disclosed in U.S. Pat. No. 3,506,327, issued Apr. 14, 1970, two coherent radiation beams are brought together with a finite angle therebetween at a radiation detector to form an interference pattern thereon. For optical holography, the radiation is within the visible region and the detector is usually photographic film which records the interference pattern between the two light radiation beams. One light beam is modified by the object scene to be recorded and the other light beam serves as a reference beam. After exposure and development of the photographic film, it is illuminated with a light beam similar to the reference beam used in constructing the hologram. The reconstructing light beam is diffracted by the recorded interference pattern into at least one diffracted beam which carries information of the object scene for viewing. An image of the object scene is so viewed in full three dimensions including parallax effects as if the object scene itself were being viewed.

A further recent improvement in the art of holography involves the use of compressional wave energy, particularly that in the ultrasonic range, and is described in U.S. Pat. No. 3,564,904, issued Feb. 23, 1971. Two coherent ultrasonic beams are caused to interfere with each other at an ultrasonic detector. The detector is illuminated with light to view in the optical domain a three-dimensional representation of the object scene. One ultrasonic beam is modified by the object scene and the other serves as a reference beam.

A more recent development in the art of holography involves scanning a substantially point receiver relative to an object scene over a surface where an interference pattern from two radiation beams exists. The received radiation is typically converted into an electrical signal. This signal modulates the intensity of a point light source that is scanned over a photographic film simultaneously with scanning the receiver over its surface. The generally required reference radiation beam may be simulated electronically by a predetermined electrical waveform being mixed with the electrical signal output of the scanning receiver. After the photographic film is fully exposed and developed, images may be holographically reconstructed therefrom in the normal manner. A system of scanned receiver holography used with ultrasonic radiation is described in U.S. Pat. No. 3,559,465, ussued Feb. 2, 1971.

The aforementioned holographic techniques involve detection of object modified radiation across a two-dimensional aperture. Synthetic aperture techniques have also been employed in holography with object modified radiation being detected at a single point. In one such technique, the object scene illuminating source is scanned over an area relative to an object scene. A substantially point receiver remains fixed relative to the object scene. Such a technique is described more fully in copending patent application Ser. No. 662,736, filed Aug. 23, 1967, now U.S. Pat. No. 3,640,598.

Another synthetic aperture technique involves fixing an object illuminating source and an object modified radiation point receiver relative to each other. The object is then scanned over a two-dimensional surface area across the object illuminating beam. The scanned surface has a center of curvature at either an apparent point radiation source or the substantially point radiation receiver. This technique is described more fully in copending patent application Ser. No. 782,582, filed Dec. 10, 1968, now U.S. Pat. No. 3,617,754.

In each of the synthetic aperture techniques described above, the holographic information that is obtained makes possible the construction of an optical hologram which has the same characteristics as one produced by other off-axis holographic techniques described above wherein object modified radiation is detected across a two-dimensional surface thereof relative to the object.

SUMMARY OF THE INVENTION

The present invention includes another technique of synthetic aperture holography from which ordinary holographic information of an object scene is produced. An object illuminating extended radiation source having a finite size in two dimensions is rotated about a point in space that is fixed with respect to the object in a manner that the object illuminating radiation beam is scanned over the object. The object illuminating radiation beam is large enough in cross-section to effectively illuminate the entire object scene. A single substantially point radiation receiver is fixed in space relative to the object scene and in the path of object modified radiation.

A reference signal that is mutually coherent with the object illuminating beam is mixed with the object modified radiation that strikes the receiver. This reference signal may be in the form of a radiation beam which intersects the object modified radiation beam at the receiver, or the reference signal may be electronically introduced into the electronic signal generated by the receiver. In either case, the resulting electronic signal provides holographic information of the object which may be recorded in the form of an optical hologram.

The primary application of the techniques of the present invention is in the field of ultrasonic holography because of the ready availability of extended coherent compressional wave energy sources. However, the principles of the present invention are applicable in holography with other types of radiation as well.

For a more detailed disclosure of the present invention and for various advantages thereof, reference should be had to the following description taken in conjunction with the accompanying drawings.

DESCRIPTION OF THE PREFERRED EMBODIMENTS

The holographic technique whose description is to follow does not depend on the particular wave radiation utilized. The inventive techniques are applicable to the entire spectrum of electromagnetic radiation, including visible light, micro-waves, infra red, ultraviolet, X-rays radiowaves, etc. The invention is also applicable to all ranges of compressional or acoustic radiation including subsonic, sonic, supersonic, ultrasonic, and hypersonic radiation. The fundamental requirement for producing holographic information is that the wave radiation utilized be coherent so that a specific wavelength can be defined. The specific coherent radiation source and receiver used in a given holographic application depends upon the particular type of wave radiation that is utilized.

The preferred embodiment of the present invention that is described hereinafter in detail, utilizes compressional wave energy in ultrasonic range but it will be understood that the present invention is not limited to such a particular system.

Figure 1:
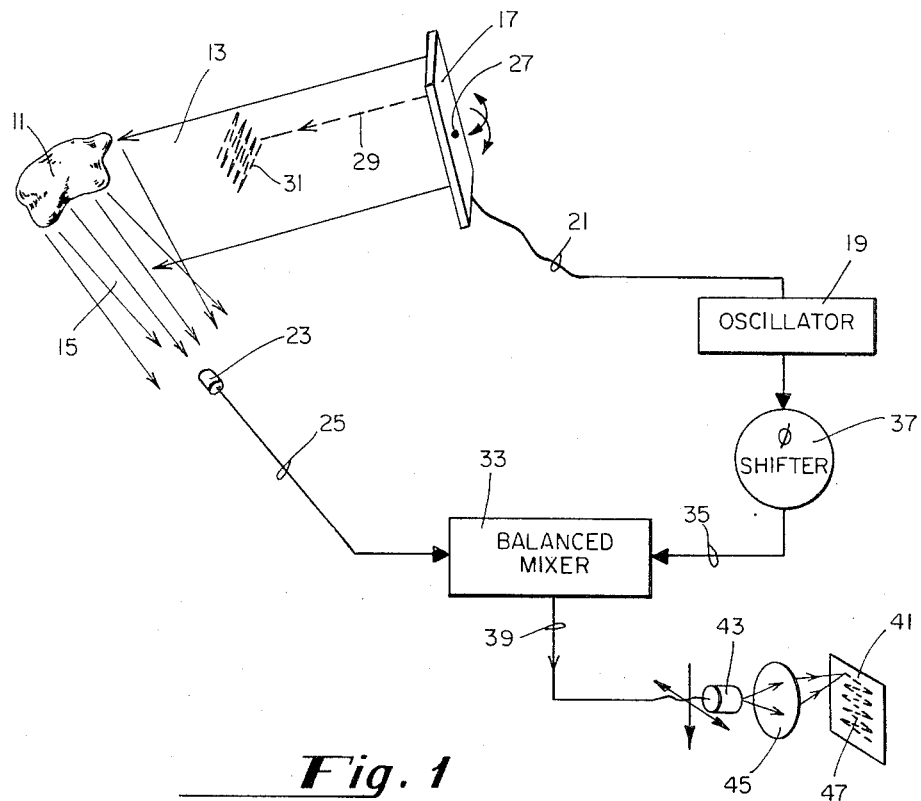
FIG. 1 is a schematic diagram of essential elements of a system for practicing the present invention.

Referring to FIG. 1, a solid object 11 is illuminated with an ultrasonic energy object illuminating beam 13, thereby generating an ultrasonic object modified beam 15. A flat quartz transducer 17 generates the object illuminating beam 15 at a single coherent frequency upon excitation by an electronic oscillator 19. The oscillator 19 is appropriately electrically connected to the transducer 17. A radio frequency power amplifier may be desired for connection to the output of the oscillator 19 in order to provide an electrical signal that is strong enough to drive the transducer 17 in a manner to generate a coherent object illuminating beam 13 with enough intensity for a holographic application.

A substantially point radiation receiver 23 is positioned in the path of the object modified beam 15. The receiver 23 preferably includes a small quartz transducer for converting the compressional wave energy of the object modified beam 15 into an electrical signal in the circuit 25. The quartz transducer of the receiver 23 preferably has maximum dimensions equal to no more than a few wavelengths of the ultrasonic energy being utilized to image the object 11.

For ultrasonic energy to travel between the transducers and the object, a coupling medium must be provided. The object 11, the object illuminating beam transducer 17 and the point receiver 23 are preferably submersed in a liquid, such as water, which has good ultrasonic energy transmitting properties. However, the transmitting medium may be air or some other gaseous material but the ultrasonic energy loses will be higher. Yet another possibility for the ultrasonic transmitting medium is a solid material or some combination of a liquid and solid material. Furthermore, the configuration of FIG. 1 could be changed so that the portion of the object illuminating beam 13 which is transmitted through the object 11 is detected by the receiver 23 rather than having the reflected ultrasonic energy detected as shown.

The substantially point receiver 23 is held fixed with respect to the object 11. In order to obtain holographic information of the object 11 as if it were being viewed through a two-dimensional surface area across the object modified beam 15, the object illuminating beam 13 is scanned across the object 11, according to the technique of the present invention, by rotating the extended source transducer 17. The transducer 17 is rotated about a point 27 that is fixed in space relative to the object 11. The point 27 may either be coincident with the transducer 17 or displaced therefrom. The transducer 17 may be rotated in any one of a number of different patterns, one of which is indicated by the arrows on FIG. 1 near the point 27. Rotation as indicated by those arrows will cause a given ray 29 of the object illuminating beam 13 to scan a raster pattern 31 in space relative to the object 11.

It is preferable, for obtaining ordinary holographic information from which a three-dimensional image of the object 11 may be reconstructed, that the transducer 17 be rotated in a manner that the object illuminating beam 13 is scanned in two-dimensions relative to the object 11. This is what is shown in FIG. 1, as indicated by the ray 29 scanning a two-dimensional pattern 31. It will be noted that the object illuminating beam 13 is broad enough to flood portions of the object 11 of which holographic information is being obtained. It is only the angle of incidence of the object illuminating beam 13 against the object 11 that is changed by rotating the transducer 17 rather than changing the portion of the object 11 that is illuminated by such a rotation.

Since a reference beam is not used in the example of FIG. 1 to interfere with the object modified beam 15 at the receiver 23, an electrical signal must be mixed with the output signal 25 of the point receiver 23. This is necessary to electronically simulate a holographic off-axis interference pattern. In order to do this electronically, a balanced mixer 33 combines the electrical signal 25 from the receiver 23 with a reference signal 35 from the oscillator 19. A signal coherent with the electrical signal 21 that drives the transducer 17 is passed from the oscillator through a phase shifter 37 to form the reference electrical signal 35. The phase shifter 37 provides an off-axis simulation in the reference signal.

A type of phase sensitive detector is preferred for use as the balanced mixer 33 and a product detector type has been found to have many advantages. An electrical output 39 of the balanced mixer 33 is a time varying electrical analog signal of a hologram. The electrical analog signal 39 at the output of the balanced mixer 33 is a signal that is nearly direct current but which varies sinusoidally with the relative phase between the output signal 25 of the receiver 23 and the reference signal 35. It is this phase amplitude signal which, when recorded as transmission variations on a photographic film, forms the desired hologram from which an image of the object 11 may be reconstructed.

One possible way of forming an optical hologram from the electrical analog signal is shown in FIG. 1. A photosensitive material 41 is scanned by a substantially point light source 43 which is imaged onto the photosenstiive material 41 by a lens 45. The intensity of the light source 43 is modulated according to the holographic electrical analog signal 39. The light source 43 is scanned as indicated by the arrows adjacent thereto of FIG. 1 in a manner that its point image is scanned over the photosensitive material 41 according to a raster pattern 47. The raster pattern 47 is similar to the raster pattern 31 with which the object illuminating beam 13 is scanned relative to the object 11. After this scanning is completed, the photosensitive material 41 is developed, if necessary for the particular material utilized to result in an optical hologram from which an optical image of the object 11 may be reconstructed. One alternative to constructing a hologram by scanning the light source 43 is to display the signal 39 on an oscilloscope and then photograph the display.

To reconstruct an image from the optical hologram 41, the hologram is illuminated with spatially coherent light which may also desirably be temporally coherent. The interference pattern recorded on the hologram 41 will diffract a portion of the reconstructing light radiation into an image carrying diffracted beam. An image of the object 11 is reconstructed in space in such a diffracted beam.

Figure 2:
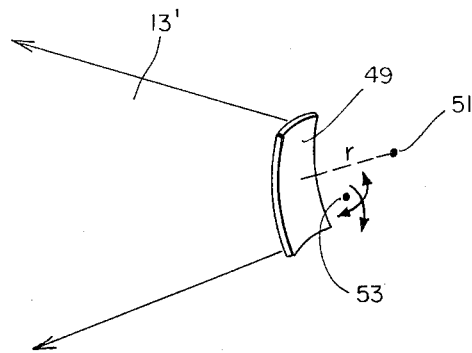
FIG. 2 shows a modification of the system of FIG. 1.

FIG. 1 has been described with respect to a flat extended transducer 17 of finite dimensions. It is also possible to practice the present invention by substituting a spherically shaped transducer 49 of FIG. 2 for the transducer 17 of FIG. 1. The spherical transducer 49 is preferably a piezoelectric transducer with a center of curvature 51. The center of curvature 51 is also the apparent point source of the generated object illuminating beam 13'. When the transducer 49 is used in the embodiment of FIG. 1 in place of the flat transducer 17, the transducer 49 of FIG. 2 is rotated about a point 53 that is fixed in space relative to the object 11. The object illuminating beam 13' is thereby scanned with respect to the object 11. The point 53 may be any convenient point in space other than the center of curvature 51 of the spherical transducer 49.

In implementing the rotation of the object illuminating transducer about a point in space fixed relative to the object being illuminated, the transducer may be held by some convenient mechanical holder that passes through the point about which the transducer is to rotate. This point of the holder is then held fixed with respect to the object in a manner that the holder and transducer are allowed to rotate.

A specific embodiment of the present invention now having been described, the full scope of the present invention is defined by the appended claims.

What is claimed:

1. A method of producing holographic information of an object scene, comprising the steps of:
    illuminating the object scene with a coherent radiation beam that is generated by an extended radiation source of finite size in two-dimensions, said radiation beam being large enough in cross-section to effectively illuminate the entire object scene,
    positioning a single substantially point radiation receiver fixed relative to the object scene to detect radiation from said beam after modification by the object scene,
    rotating said extended radiation source about a point fixed with respect to said object scene in a manner that said object illuminating radiation beam is scanned over said object scene, and
    mixing a reference signal with the object modified radiation striking the receiver, said reference signal being mutually coherent with said object scene illuminating beam, thereby producing a holographic information signal of the object scene.

2. The method as defined by claim 1 wherein the step of rotating said source includes a rotation which causes said object illuminating beam to be scanned in two dimensions over the object scene.

3. The method according to claim 2 wherein an optical hologram is recorded, comprising the additional steps of:
    scanning a radiation beam over a radiation sensitive two-dimensional material with a pattern that is a substantial replica of the scanning pattern of the object illuminating beam relative to the object, and
    modulating the intensity of said reconstructing radiation beam by said holographic information signal.

4. A method of ultrasonic holography, comprising the steps of:
    directing a coherent ultrasonic beam through an ultrasonic energy transmitting medium to illuminate an object scene, said beam being generated by an ultrasonic transducer of finite size in two dimensions, said ultrasonic beam being large enough in cross-section to effectively illuminate the entire object scene,
    positioning a single substantially point transducer fixed relative to the object scene to receive ultrasonic energy of the object illuminating beam after modification by the object, said object modified radiation passing from the object through said ultrasonic transmitting medium to said transducer,
    rotating said object illuminating transducer about a point fixed with respect to said object scene in a manner that the object illuminating ultrasonic beam is scanned over said object scene, and
    mixing a reference signal with the object modified radiation that strikes the receiving transducer, said reference signal being mutually coherent with the object scene ultrasonic illuminating beam, thereby producing a holographic information signal of the object scene.

5. The method according to claim 1 wherein said object illuminating ultrasonic transducer includes a flat quartz sheet.

6. The method according to claim 4 wherein said object illuminating transducer includes a spherical piezoelectric material having a center of curvature, said spherical transducer being rotated about a point fixed with respect to said object scene that is not coincident with said spherical center of curvature.

* * * * *